(12) United States Patent
Snipes et al.

(10) Patent No.: US 11,154,004 B2
(45) Date of Patent: Oct. 26, 2021

(54) AGRICULTURAL SEED SENSING AND CONTROL SYSTEM

(71) Applicant: Deere & Company, Moline, IL (US)

(72) Inventors: Terry L. Snipes, Moline, IL (US);
Robert T. Casper, Davenport, IA (US);
William C. Hughes, Moline, IL (US);
Gerald E. Rains, Eldridge, IA (US);
Jason D. Walter, Bettendorf, IA (US);
Elijah B. Garner, Bettendorf, IA (US);
Matt D. Bartelson, Bettendorf, IA (US); Sahil C. Desai, Bettendorf, IA (US); Andrew J. Scholl, Bettendorf, IA (US)

(73) Assignee: Deere & Company, Moline, IL (US)

( * ) Notice: Subject to any disclaimer, the term of this patent is extended or adjusted under 35 U.S.C. 154(b) by 257 days.

(21) Appl. No.: 16/395,729

(22) Filed: Apr. 26, 2019

(65) Prior Publication Data

US 2020/0337223 A1    Oct. 29, 2020

(51) Int. Cl.
*A01C 7/10* (2006.01)
*A01C 7/08* (2006.01)
*G01F 1/00* (2006.01)
*A01C 15/00* (2006.01)

(52) U.S. Cl.
CPC .............. *A01C 7/105* (2013.01); *A01C 7/081* (2013.01); *G01F 1/00* (2013.01); *A01C 15/005* (2013.01)

(58) Field of Classification Search
CPC ....... A01C 7/105; A01C 7/081; A01C 15/005; A01C 7/102; A01C 7/10; A01C 7/08; A01C 7/00; A01C 15/00; G01F 1/00
See application file for complete search history.

(56) References Cited

U.S. PATENT DOCUMENTS

| 8,504,310 B2 | 8/2013 | Landphair et al. |
| 2010/0115974 A1 | 5/2010 | Liu et al. |
| 2012/0036914 A1 | 2/2012 | Landphair et al. |

FOREIGN PATENT DOCUMENTS

| DE | 10338005 A1 | 3/2005 |
| EP | 1560157 A2 | 8/2005 |

OTHER PUBLICATIONS

Extended European Search Report issued in European Patent Application No. 20170915.1 dated Aug. 7, 2020, in 9 pages.

*Primary Examiner* — Christopher J. Novosad
(74) *Attorney, Agent, or Firm* — Christopher J. Volkmann; Kelly, Holt & Christenson, PLLC

(57) ABSTRACT

An example agricultural machine comprises a material distribution system that includes a material distribution line configured to convey particulate material to a component. The agricultural machine comprises a sensing system that includes a first sensor configured to generate a first sensor signal indicative of a measure of a flow of the particulate material in the material distribution line, a second sensor configured to generate a second sensor signal indicative of a measure of the flow of the particulate material in the material distribution line, and a correlation generation component configured to receive indications of the first and second sensor signals and to generate a correlation metric that represents a correlation between the first and second sensor signals. In one example, the correlation metric is applied to a sensor signal from a second material distribution line to determine a flow rate in the second material distribution line.

19 Claims, 10 Drawing Sheets

AGRICULTURAL SEED SENSING AND CONTROL SYSTEM

FIELD OF THE DESCRIPTION

The present description generally relates to sensing systems for sensing a material flow rate. More specifically, but not by limitation, the present description relates to sensing system for an agricultural machine that is configured to sense a quantity or flow rate of an agricultural product (e.g., seeds) through a distribution line.

BACKGROUND

Some agricultural machines, as well as some machines in non-agricultural applications, include a distribution system for distributing product to one or more end point components. An example distribution system comprises a pneumatic distribution system that utilizes air under pressure to convey particulate material to the one or more end point components.

In an example agricultural application, an air seeder uses an air distribution system comprises an air source that provides air flow to a plurality of distribution lines or runs. A metering system, such as a volumetric meter, is used to meter particulate material or other product (e.g., seed, fertilizer, etc.) into the air flow. A controller controls the metering system to meter the product at a desired flow rate.

The discussion above is merely provided for general background information and is not intended to be used as an aid in determining the scope of the claimed subject matter.

SUMMARY

An example agricultural machine comprises a material distribution system that includes a material distribution line configured to convey particulate material to a component. The agricultural machine comprises a sensing system that includes a first sensor configured to generate a first sensor signal indicative of a measure of a flow of the particulate material in the material distribution line, a second sensor configured to generate a second sensor signal indicative of a measure of the flow of the particulate material in the material distribution line, and a correlation generation component configured to receive indications of the first and second sensor signals and to generate a correlation metric that represents a correlation between the first and second sensor signals. In one example, the correlation metric is applied to a sensor signal from a second material distribution line to determine a flow rate in the second material distribution line.

An example method performed by an agricultural machine comprises receiving a first sensor signal from a first sensor that senses a first flow of particulate material along a first material distribution line, receiving a second sensor signal from a second sensor that senses the first flow of particulate material along the first material distribution line, generating a correlation metric that represents a correlation between the first sensor signal and the second sensor signal, receiving a third sensor signal from a third sensor that senses a second flow of particulate material along a second material distribution line, determining a rate of the second flow by applying the correlation metric to the third sensor signal, and generating a control signal that controls the agricultural machine based on the determined rate.

An example agricultural machine comprises a distribution system includes a first distribution line configured to convey a first seed flow to a first component and a second distribution line configured to convey a second seed flow to a second component. The agricultural machine comprises a metering system configured to meter seeds into the first and second distribution lines and a seed sensing system. The seed sensing system comprises a first seed sensor configured to generate a first sensor signal indicative of the first seed flow, a second seed sensor configured to generate a second sensor signal indicative of the first seed flow, a correlation generation component configured to receive indications of the first and second sensor signals and generate a correlation metric that represents a correlation between the first sensor signal and the second sensor signal, a third seed sensor configured to generate a third sensor signal indicative of the second seed flow, and a correlation application component configured to determine a rate of the second seed flow based on applying the correlation metric to the third sensor signal. The agricultural machine comprises a control system configured to generate a control signal that controls the agricultural machine based on the determined rate.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
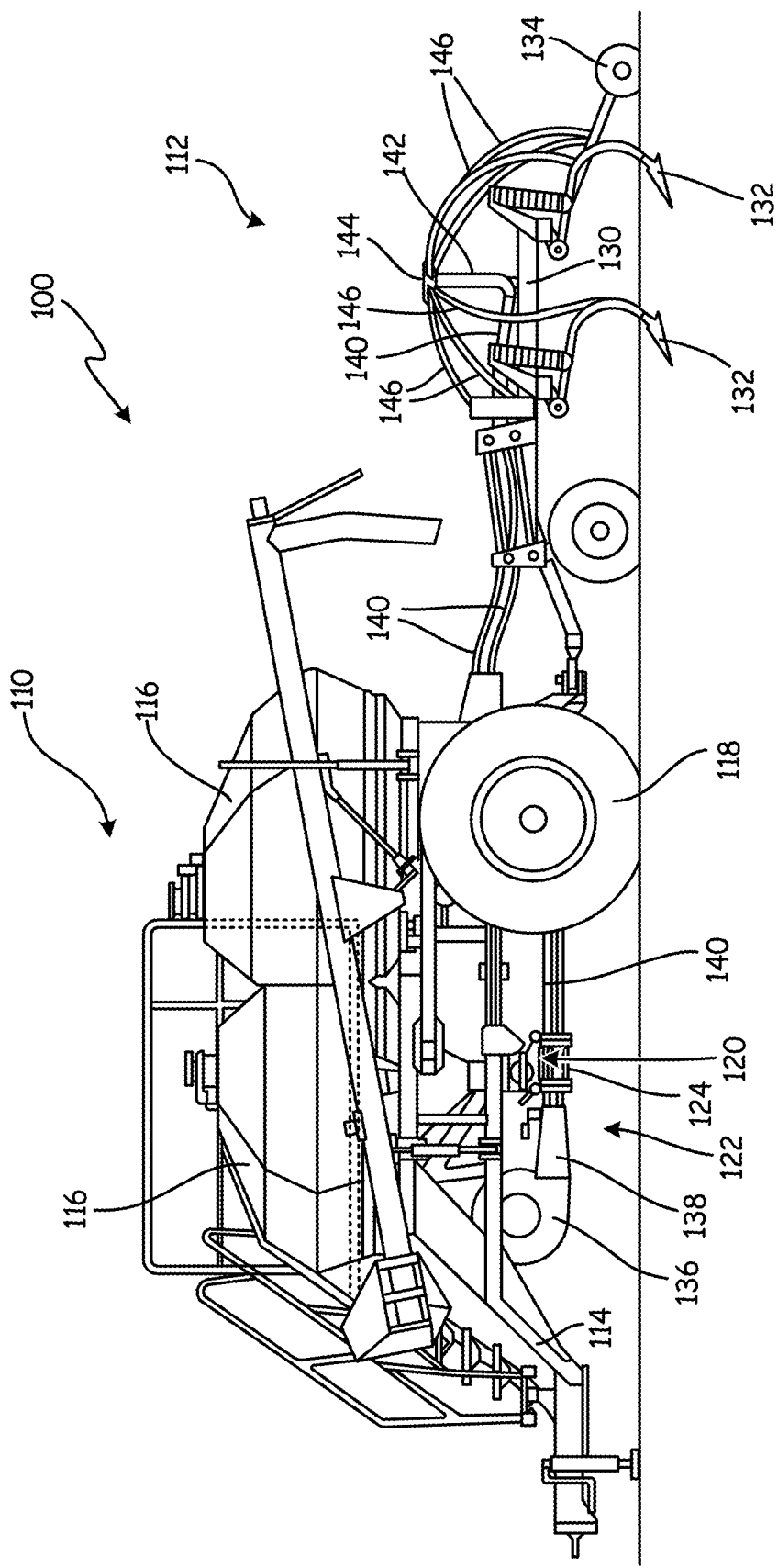
FIG. 1 illustrates a side view of one example of an agricultural machine for distributing agricultural product.

The present disclosure generally relates to sensing systems for sensing a material flow rate. More specifically, but not by limitation, the present description relates to a sensing system for an agricultural machine that is configured to sense a flow rate, or quantity/count, of an agricultural product (e.g., seeds) through a distribution line.

In one agricultural example, seeds are conveyed along a seed distribution line to an endpoint component, and are sensed (e.g., counted) by a seed sensing system which generates a signal indicative of the sensed flow rate or count. The seeds are conveyed to an end point component, such as a row unit, which disburses the seeds onto or into the ground. One example includes a ground-engaging opener which places the seeds into a furrow. The seed distribution system can comprise a pneumatic distribution system that utilizes air under pressure to convey seeds to the row unit. Alternatively, or in addition, other conveyance mechanism, such as mechanical and/or gravity drop conveyance mechanisms can be utilized.

The sensed flow rate can be utilized in a variety of different processes. For example, the sensed flow rate can be utilized to control a metering system to meter the seeds at a desired flow rate. Alternatively, or in addition, the sensed flow rate can be provided to a user, such as an operator of the agricultural machine for display and/or manual control of the metering system. The agricultural machine can include or generate user interface(s) with user input mechanism(s) utilized by the operator to control and manipulate the agricultural machine, such as by adjusting the settings or other operation of the metering system to change the seed flow rate. User input mechanisms can be rendered via a visual display and/or audio input/output mechanisms. It is noted that, in one example, user interfaces are generated in an operator compartment of the agricultural machine. For example, a wide variety of user interface components to be provided such as, but not limited to, levers, switches, wheels, joysticks, buttons, a steering wheel, pedals, etc. The mechanisms can also include microphones with speech recognition systems and natural language processing systems, to process speech inputs.

The sensed flow rate can also be provided to a remote computing system and/or other agricultural machine(s) for storage and/or analysis. These, of course, are by way of example only.

It is noted that while examples of a material sensing system are described herein in the context of sensing a flow rate of seeds on an agricultural seeding machine, the described concepts can be utilized in a wide variety of other applications, including both agricultural and non-agricultural applications. For example, in the context of another agricultural application, the material sensing system can sense other types of particulate material, such as fertilizer, herbicides, pesticides, etc. Further, the material sensing system can be utilized in automotive applications, construction applications, industrial applications, to name a few, that require the sensing of material flow rate. Before discussing the material sensing system in further detail, example agricultural product distribution machines will be described.

FIG. 1 illustrates a side view of one example of an agricultural product distribution machine for distributing agricultural product in the form of seed, or other particulate material. In the illustrated example, the machine comprises an air seeder 100 that pneumatically delivers (e.g., using forced air from a blower) seed to ground engaging openers. Of course, other types of product distribution machines and particulate materials can be utilized.

Seeder 100 comprises a seed cart 110 towed between, for example, a support vehicle such as a tractor (not shown) and a tilling implement 112. The support vehicle includes a propulsion system for propelling or otherwise moving the vehicle over or relative to a terrain. Therefore, the propulsion system can be any propulsion system that is suitable to the particular machine. In a case of a tractor or other similar support machine, the propulsion system can comprise an engine with a transmission that drives ground-engaging mechanisms such as wheels, tracks, etc.

The seed cart 110 includes a frame 114 to which product tanks 116 and wheels 118 are mounted. Each product tank 116 includes an associated metering system 120 at its lower end for controlled feeding of a product into a pneumatic distribution system 122. The metering system 120 is adjacent to a discharge end of a product tank 116. The tilling implement 112, towed behind the seed cart 110, comprises a frame 130 to which a plurality of row units are mounted. In the illustrated example, each row unit comprises a ground opener 132. Incorporation of seed row finishing equipment, such as closing wheels 134, can also be utilized, in one example.

Metering system 120 is controllable to change the seed metering rate into pneumatic distribution system 122, and thus the rate at which seeds flow to openers 132. Metering system 120 can be driven and/or controlled electronically, hydraulically, pneumatically, a combination thereof, etc.

Pneumatic distribution system 122 includes an air source 136, such as, but not limited to, a fan, blower, compressor, and/or pump. In the illustrated example, air source 136 comprises a centrifugal fan (also referred to as centrifugal fan 136) connected to a plenum 138, which in turn is connected through one or more conduits to one or more primary distribution manifolds 124. Each manifold 124 is configured to receive product from one of product tanks 116 that is metered through metering system 120.

In one example, metering system 120 comprises one or more volumetric meters that volumetrically meter product into distribution system 122. Volumetric meters are commonly used in agricultural equipment, such as grain drills, air seeders or fertilizer applicators, to meter product (e.g. seed, fertilizer, etc.) during distribution. In one example, a volumetric meter employs one or more metering rollers contained within a housing. The housing has an inlet that receives product from the tank. The tank feeds the product into the housing utilizing a delivery mechanism (e.g. air, gravity, feed mechanisms, etc.). In one particular example, the tank is located above the housing and product is fed into the housing using gravity.

Each individual passage in the primary distribution manifold 124 is connected by a primary distribution line 140 to a riser tube 142, which is in turn coupled to a secondary distribution header 144. Header 144 operates as a splitter, to split the seed flow from primary distribution line 140 into a plurality of secondary distribution lines 146. Each secondary distribution line 146 is coupled to one (or more) seed boot mounted on one (or more) ground opener 132 to deliver the seed to a furrow formed by the opener 132. The seed flow rate, or seed count, along each secondary distribution line 146 can be sensed using one or more seed sensors.

In the illustrated example, a plurality of distribution streams are formed and comprise a plurality of lines, or runs, to row units on air seeder 100. As used herein, a "line" refers to a channel or path. For instance, a line can provide a seed path to one or more row units having furrow opener(s). Further, a line can be formed by a plurality of separate elements connected together. For instance, a line can comprise separate conduit(s), tube(s), manifold(s), meter(s), row unit(s), etc., coupled together to form a single distribution path to an end point.

While seeder 100 of FIG. 1 is shown as a separate seed cart 110 connected to tilling implement 112, in one example, the product tank 116, metering system 120 and pneumatic distribution system 122 can be mounted on the same frame as the ground openers 132.

Figure 2:
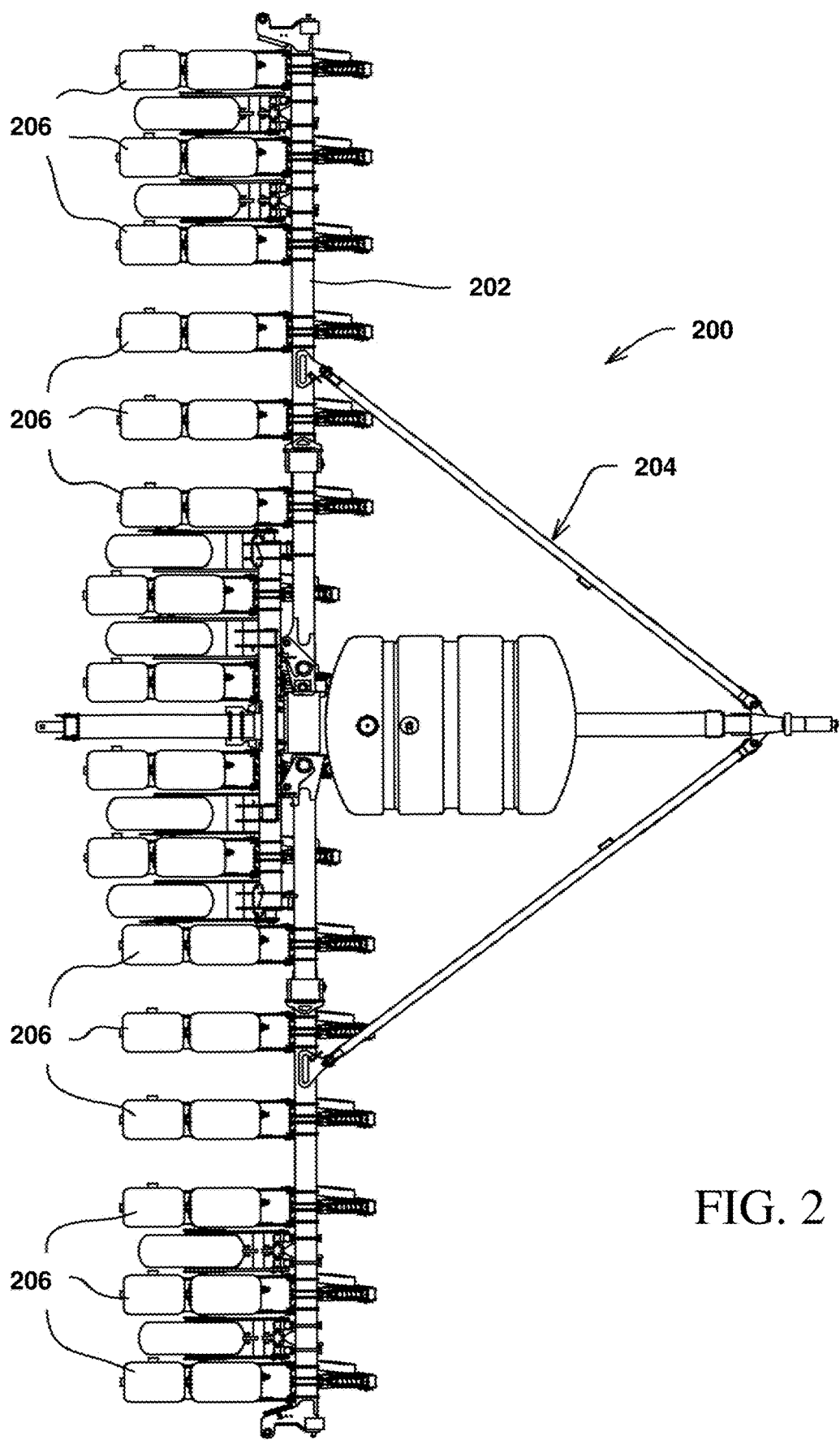
FIG. 2 illustrates a top view of one example of an agricultural machine for distributing agricultural product.

FIG. 2 is a top view of another example of an agricultural product distribution machine for distributing agricultural product in the form of seed or other particulate material. In the illustrated example, the machine comprises a row crop planting machine 200 that illustratively includes a toolbar 202 that is part of a frame 204. FIG. 2 also shows that a plurality of planting row units 206 are mounted to the toolbar 202. Machine 200 can be towed behind another machine, such as a tractor.

In one example, each row unit includes one or more tanks (e.g., chemical tank, seed storage tank, etc.). It also illustratively includes a disc opener, a set of gauge wheels, and a set of closing wheels. Seeds from the seed storage tank are fed by gravity into a seed meter. The seed meter controls the rate at which seeds are dropped into a seed tube, or other seed distribution line, from the seed storage tank. The seed flow rate, or seed count, along the distribution line is sensed using one or more seed sensors.

It will be noted that different types of seed meters can be utilized. In one example, each row unit need not have its own seed meter. Instead, metering or other singulation or seed dividing techniques can be performed at a central location, for groups of row units 106. The metering systems can include rotatable discs, rotatable concave or bowl-shaped devices, among others. The seed delivery system can be a gravity drop system in which seeds are dropped through the seed tube 120 and fall (via gravitational force) through the seed tube into the seed trench. Other types of seed delivery systems are assistive systems, in that they do not simply rely on gravity to move the seed from the metering system into the ground. Instead, such systems actively capture the seeds from the seed meter and physically move the seeds from the meter to a lower opening, where they exit into the ground or trench.

Figure 3:
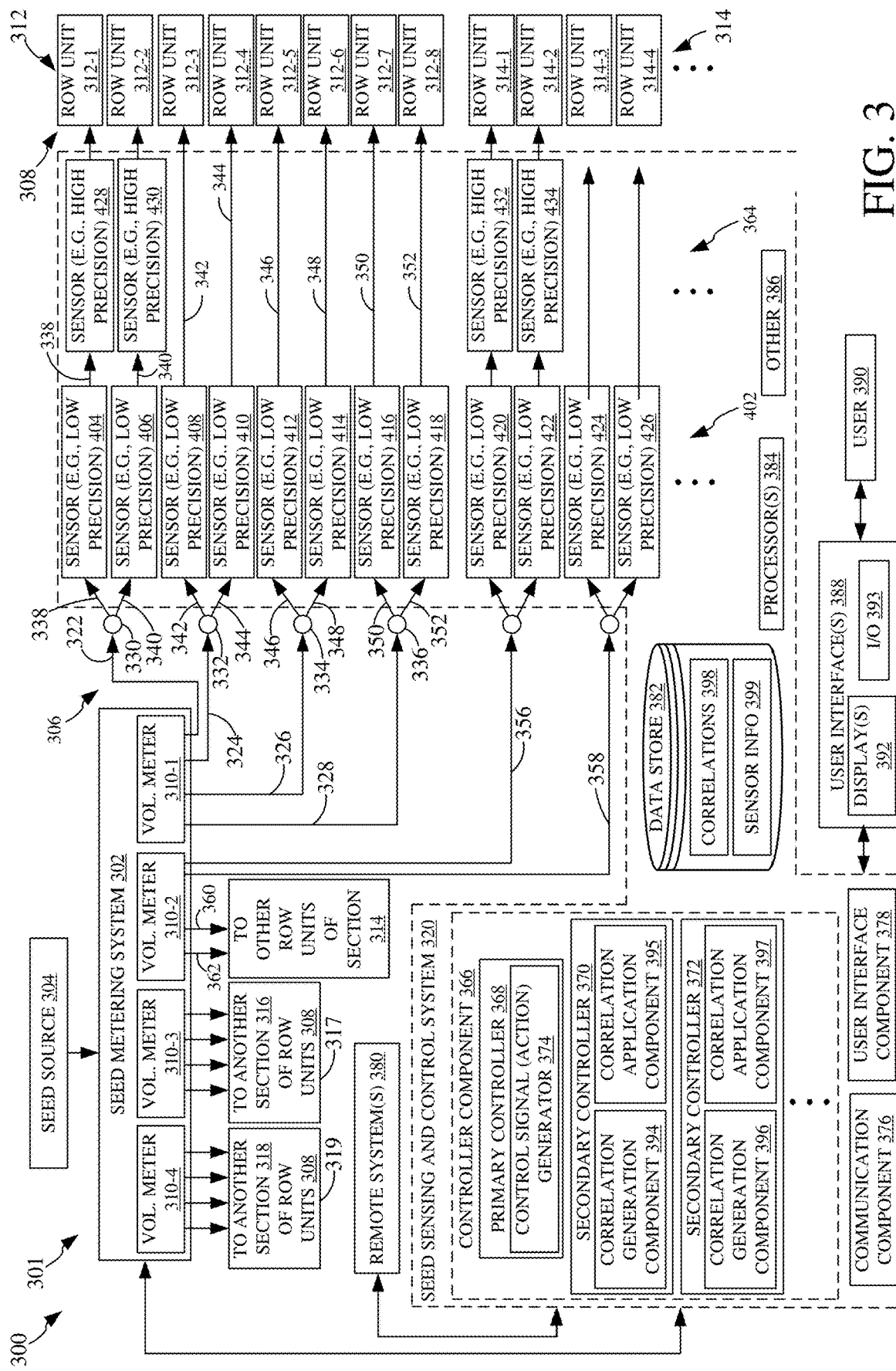
FIG. 3 is a schematic diagram illustrating one example of an agricultural machine architecture.

FIG. 3 is a schematic diagram illustrating one example of an agricultural machine architecture 300 including an agricultural machine 301. Examples of agricultural machine 301 include, but are not limited to, agricultural machines 100 and 200 illustrated in FIGS. 1 and 2, respectively.

Machine 301 includes a seed metering system 302 configured to meter seeds from a seed source 304. Seed metering system 302 meters the seeds, through a seed distribution system 306, to a plurality of distribution end point components. In the present example, the end point components comprise a plurality of row units 308.

In the present example, seed metering system 302 includes a plurality of volumetric meters 310-1, 310-2, 310-3, 310-4 (collectively referred to as volumetric meters 310), each configured to volumetrically meter seeds to a different section of the row units 308. In the illustrated example, agricultural machine includes thirty-two row units, divided into four sections (i.e., 312, 314, 316, 318) of eight row units each. This, of course, is by way of example only. Agricultural machine 301 can include more or less row units 308 and volumetric meters 310.

Volumetric meter 310-1 illustratively meters seeds through distribution system 306 to section 312 of eight row units, illustrated in FIG. 3 as row units 312-1, 312-2, 312-3, 312-4, 312-5, 312-6, 312-7 and 312-8. Similarly, volumetric meter 310-2 meters seed through distribution system 306 to section 314 of eight row units (in FIG. 3, only four row units 314-1, 314-2, 314-3, 314-4 are shown). For sake of illustration, the third and fourth sections are generally represented by blocks 317 and 319, respectively. As such, in this example, each volumetric meter 310 meters product to a section of the row units that comprises one-fourth of row units 308.

Distribution system 306 comprises a plurality of distribution lines that convey the metered seed from volumetric meters 310 to row units 308. As discussed in further detail below, a seed metering and control system 320 is configured to sense the seed flow rate along the distribution lines. Before discussing seed sensing and control system 320 in further detail, it is noted that in the present example distribution system 306 comprises a plurality of primary distribution lines that receive metered product from volumetric meters 310 and convey the metered seed to a splitter component (e.g., header 144 illustrated in FIG. 1) which splits the seed into a plurality of secondary distribution lines that provide a seed flow path to the row units 308. In the illustrated example, volumetric meter 310-1 meters seed into primary distribution lines 322, 324, 326, and 328, which are coupled to respective splitter components 330, 332, 334, and 336 which split the flows into secondary distribution lines 338 and 340, 342 and 344, 346 and 348, and 350 and 352.

Similarly, volumetric meter 310-2 meters product into primary distribution lines 356, 358, 360, and 362 which are coupled to splitter components that split the primary distribution lines into a plurality of secondary distribution lines.

System 320 comprises a set of seed sensors 364 associated with the distribution lines to row units 308 and are configured to sense the flow rate or count of seeds (and thus the seeding rate) for the row units 308. This provides an indication as to the rate at which the seeds are being dispersed into the ground (e.g., into a furrow formed in the ground by the row units 308). Before discussing operation of the seed sensors in further detail, a discussion of other components of system 320 will be provided.

System 320 illustratively includes a controller component 366 configured to receive signals from sensors 364. Controller component 366 can include one or more controllers. Illustratively, but not by limitation, controller component 366 includes a primary controller 368 and a set of secondary controllers, each corresponding to a particular one of the sections 312, 314, 316, 318 and configured to receive signals from the sensors in the corresponding section. That is, as shown in FIG. 3, a secondary controller 370 corresponds to, and is configured to receive sensor signals from, section 312 and a secondary controller 372 corresponds to, and is configured to receive signals from the sensors in section 314. The secondary controllers for sections 316 and 318 are not illustrated in FIG. 3, for the sake of brevity.

Secondary controllers 370 and 372 are configured to communicate with primary controller 368, which includes a control signal (or action) generator 374. Control signal generator 374 is configured to generate control signals that control operation of various aspects of agricultural machine 301. Examples include, but are not limited to, control signals for a machine propulsion system, seed metering system 302, distribution system 306, sensors 364, a communication component 376 and/or a user interface component 376.

Communication component 376 includes wireless communication (or other types of communication) logic, and can include other items as well. Using wireless communication logic, communication component 376 facilitates communication over a network, which can be a wide variety of different types of networks, such as the Internet, or another wide area network, a variety of other wireless or wired networks, etc. Wireless communication logic can be substantially any wireless communication system that can be used by the systems and components of machine 301 to communicate information to other items in machine 301 and/or to remote system(s) 380.

Remote system(s) 380 can be a wide variety of different types of systems. For example, remote system can be a remote server environment, remote computer system that may be used, for instance, by a farmer, a farm manager, etc. Further, it can be a remote computing system, such as a mobile device, remote network, or a wide variety of other remote systems.

System 320 also includes a data store 382, one or more processors 384, and it can include other items 386 as well.

User interface component 378 is configured to generate or otherwise provide user interface(s) 388, that facilitate interaction with a user 390. A user interface 388 can include display(s) 392 generated, for example, in an operator compartment of machine 301. User interface(s) 388 can include other types of input/output (I/O) mechanisms 393 as well.

Referring again to controller component 366, a correlation generation component is configured to receive signals from a set of the seed sensors 346 and to generate a correlation between those sensors, which is then applied by a correlation application component to extrapolate seed flow rates. This is discussed in further detail below. In the example of FIG. 3, secondary controller 370 includes a correlation generation component 394 and a correlation application component 395. Secondary controller 372 includes a correlation generation component 396 and a correlation application component 397. The generated correlations can be stored in data store 392. This is represented by block 398. Data store 382 can store the sensor information 399 from sensors 364, and can store other items as well.

It is noted that while controller component 366 is illustrated as having multiple controllers and components that correspond to different sections on machine 301, the functionality ascribed to each block can be combined and/or further separated and performed by other components. For instance, a single controller can receive the sensor signals from all sensors 364 and generate and apply the correlations, as well as generate the control signal for machine 301.

As also illustrated in FIG. 3, each secondary distribution line to a row unit 308 comprises at least one sensor (referred to as a "first" seed sensor, for the sake of the present discussion) on the distribution line configured to sense a flow rate of seeds through that distribution line. It is noted that reference herein to the seed sensor as a "first" seed sensor is not intended to imply that the distribution line has a second seed sensor. Further, it is noted that the seed sensors can be any suitable sensor type(s) including, but not limited, optical sensors having optical components such as LED(s) (or other light source(s)) and one or more optical reads configured to sense the passage of seeds through the distribution line.

As shown in FIG. 3, a set of first sensors 402 includes sensors 404, 406, 408, 410, 412, 414, 416, 418, 420, 422, 424, and 426. In one example, some or all of the first seed sensors 402 are substantially similar to one another (e.g., they have substantially similar sensing precisions). By substantially similar sensing precisions, it is meant that the seed sensors are configured such that they each have a sensing precision within ten percent of one another for a given flow rate. In one example, substantially similar seed sensors have sensing precisions within five percent of each other. In one example, the substantially similar seed sensors have the same sensing precision.

Further, in the present example, the first seed sensors have components that are considered to be low precision or rate, in terms of their maximum seed flow sensing capabilities. In one example, the sensing precision of a given seed sensor is defined by the maximum seed flow rate (e.g., seeds per second (seeds/sec) that the seed sensor can sense within a defined threshold error rate (e.g., twenty percent, ten percent, five percent, etc.). The error rate comprises the deviation of the measured rate from the actual rate.

For sake of the present discussion, a low precision seed sensor has a maximum seed sensing rate less than approximately one hundred seeds/sec. That is, the error rate of the low precision sensor exceeds the threshold error rate for seed flow rates above approximately one hundred seeds/sec. In one particular example, the low precision seed sensors have a maximum seed sensing rate at (or less than) approximately fifty seeds/sec with an error rate at (or less than) approximately twenty percent.

A low precision seed sensor can provide a relatively accurate measure of seed flow rate for actual seed flows at or below its maximum seed sensing rates. For higher seed flow rates that exceed the maximum seed sensing rate, the error rate of the low precision seed sensor is significantly higher. Thus, while a low precision sensor can be utilized for blockage sensing at high seed flow rates, they often do not provide an otherwise meaningful measure of the actual flow rate. For sake of illustration, but not by limitation, assume a set of low precision seed sensors, with a maximum seed sensing rates of fifty seed/sec, are utilized on a set of distribution lines that each convey two hundred seeds/sec (or more—some seeding applications use rates up to six hundred seeds/sec). However, the optical component(s) of one of the low precision seed sensors in a first distribution line outputs a first signal indicating that seventy five particles per second where sensed (this deviation can be caused by, for example, multiple seeds being misinterpreted as a single seed, seeds being missed, etc.), and the optical component(s) of another one of the low precision seed sensors in a second distribution line outputs a second signal indicating that ten particles per second where sensed. While the first signal is not an accurate representation of the actual seed flow rate, it can be utilized to determine that the second distribution line is experiencing an anomaly, which may be caused by a blockage or some other malfunction in the metering and/or distribution system.

In the illustrated example, the seed sensing system comprises a second seed sensor (i.e., sensors 428, 430, 432, 434), in addition to the first seed sensor, on at least one of the distribution lines. The second seed sensor has a higher sensing precision compared to the first seed sensor. That is, the second seed sensor is on the same distribution line as, and is in series with, a first seed sensor and has a higher maximum seed sensing precision than the first seed sensor. In one example, the maximum seed sensing rate of the second (e.g., high precision) seed sensor is at least four times higher than the first (e.g., low precision) seed sensor. For instance, the maximum seed sensing rate of the second sensor is six to eight times higher than the first seed sensor. In another particular example, the maximum seed sensing rate of the second seed sensor is ten times higher than the first seed sensor. In one particular example, a second seed sensor has a maximum seed sensing rate of four hundred seeds/sec, or more.

The signal from the second seed sensor, on a particular one of the distribution lines, is utilized by a correlation generation component (i.e., component 394, 396) to correlate the signal to the sensor signal received from the first seed sensor on the same particular distribution line. As such, the sensor signal from the first sensor (e.g., low precision sensor) provides a signal that is relatively inaccurate, but the signal from the second seed sensor (e.g., high precision seed sensor) is then utilized to generate a correlation metric that can be applied to the first sensor signal to give an improved (i.e., more accurate) indication of the actual seed flow rate.

Accordingly, in the illustrated example, a correlation metric can be generated from the first and second seed sensors in a first one of the distribution lines, and then applied to the sensor signal from one or more other distribution lines that only have a low precision seed sensor, or at least do not have a high precision seed sensor. The correlation metric can thus be utilized for seed rate extrapolation across low precision sensors to provide improved seed rate detection, without requiring a high precision sensor to be installed on all of the distribution lines.

In the illustrated example, each section 312, 314, 316, 318 includes at least one second sensor on at least one of the distribution lines in that section. The sensor signal from that second sensor is provided to the correlation generation component in the secondary controller associated with that section and then used to generate a correlation metric for that section, which is applied by the correlation application component to the sensor signal from the first sensor on the other distribution lines in that section. In the illustrated example, two second sensors (428 and 430, 432 and 434) are provided in each section, and are on distribution lines associated with a same splitter component. This can be utilized to provide correlation metrics that are utilized by the controller component 366 to determine operational characteristics indicative of how well the splitter component is operating and/or can be combined to generate an average (or otherwise combined) rate offset to be applied to the sensor signals from the other distribution lines.

Figure 4:
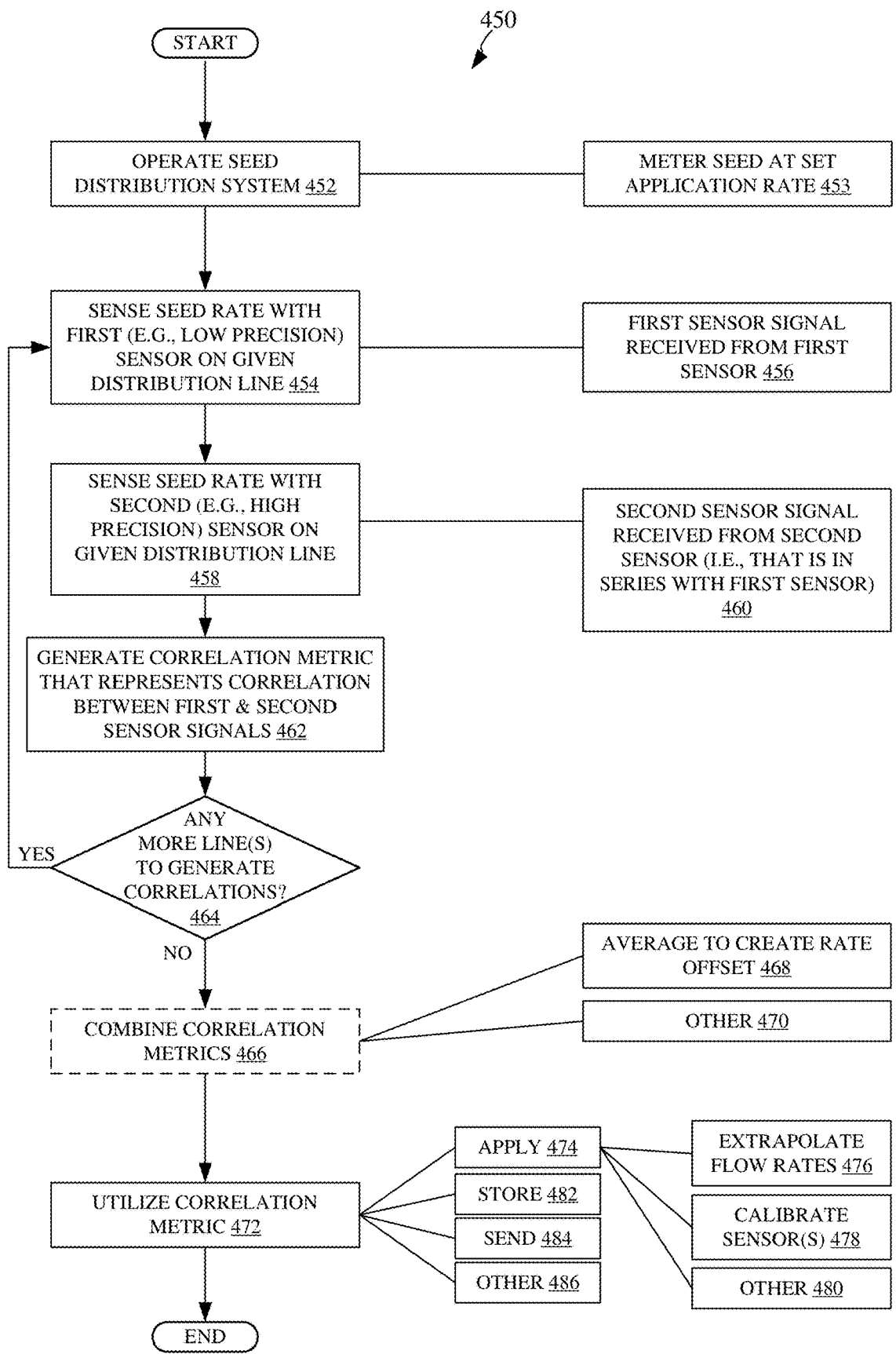
FIG. 4 is a flow diagram illustrating an example method for generating correlation metrics from seed sensor signals.

FIG. 4 illustrates an example method 450 for generating correlation metrics. For sake of illustration, but not by limitation, method 450 will be discussed with respect to architecture 300 shown in FIG. 3.

At block 452, seed distribution system 306 is operated to distribute seed along distribution lines to row units 308. This includes metering system 302 metering seed at a set application rate (e.g., a rate set by user 390 via user interfaces 388). Volumetric meter 310-1 operates to meter seed into primary distribution lines 322, 324, 326, and 328. This is represented by block 453.

At block 454, the seed flow rate is sensed by the first sensor (e.g., low precision sensor) on a given one of the distribution lines. For instance, secondary controller 370 receives a first sensor signal from the first sensor 404 on distribution line 338. This is represented by block 456.

At block 458, the seed flow rate is sensed with a second sensor (e.g., a high precision sensor) on the same distribution line. For instance, in the above example, secondary controller 370 receives a second sensor signal from second sensor 428 on distribution line 338. This is represented by block 460.

At block 462, correlation generation component 394 generates a correlation metric or value that represents a correlation between the first and second sensor signals received from first sensor 404 and second sensor 428. The generated correlation metric is tagged with an identifier that identifies (or is otherwise associated with) at least the first sensor from which the correlation metric was generated. For sake of illustration, assume that the first sensor signal from first sensor 404 indicates a sensed flow rate of eighty-five seeds/sec and the second sensor signal from second sensor 428 indicates a sensed flow rate of two hundred twenty five seeds/sec. The generated correlation metric would be associated with sensor 404 and indicate the correlation between these two sensed flow rates. That is, application of the correlation metric to the sensed rate of eighty-five seeds/sec obtains a final measured rate of two hundred twenty five seeds/sec.

At block 464, the method determines whether there are any more lines for which to generate correlations. For example, block 464 determines that a second distribution line 340 includes first and second sensors (406 and 430) for which to generate a correlation metric. In this case, blocks 454-462 are repeated for the sensor signals from sensors 406 and 430 on distribution line 340. Block 464 can also perform steps 454-462 for sensors in other sections, such as sensors 420, 432, 422, and 434 in section 314.

If multiple correlation metrics are generated in a same section, or are otherwise associated with one another, the correlation metrics can be combined at block 466. In one example, the correlation metrics can be averaged to create a rate offset at block 468. For sake of illustration, correlation generation component 394 generates a first correlation metric based on the sensor signals from sensors 404 and 428 and generates a second correlation metric based on the signals received from sensors 406 and 430. Component 394 can combine these by averaging, weighting, or otherwise, to generate a rate offset. The correlation metrics can be combined in other ways as well. This is represented by block 470.

At block 472, the correlation metric is utilized. This can be done in a wide variety of ways. In one example, the correlation metric is applied at block 474. One example of applying the correlation metric is discussed below with respect to FIG. 5. Briefly, however, the correlation metric can be applied to extrapolate flow rates at block 476, calibrate one or more of the sensors at block 478, or in other ways (block 480) as well.

The correlation metric can be stored at block 482, such as in data store 382 as correlations 398 that includes tag information that identifiers the sensor(s) that the correlation metric is associated with. At block 484, the correlation metric can be sent to remote system(s) 380 for storage and/or analysis. The correlation metric can be utilized in other ways as well. This is represented at block 486.

Figure 5:
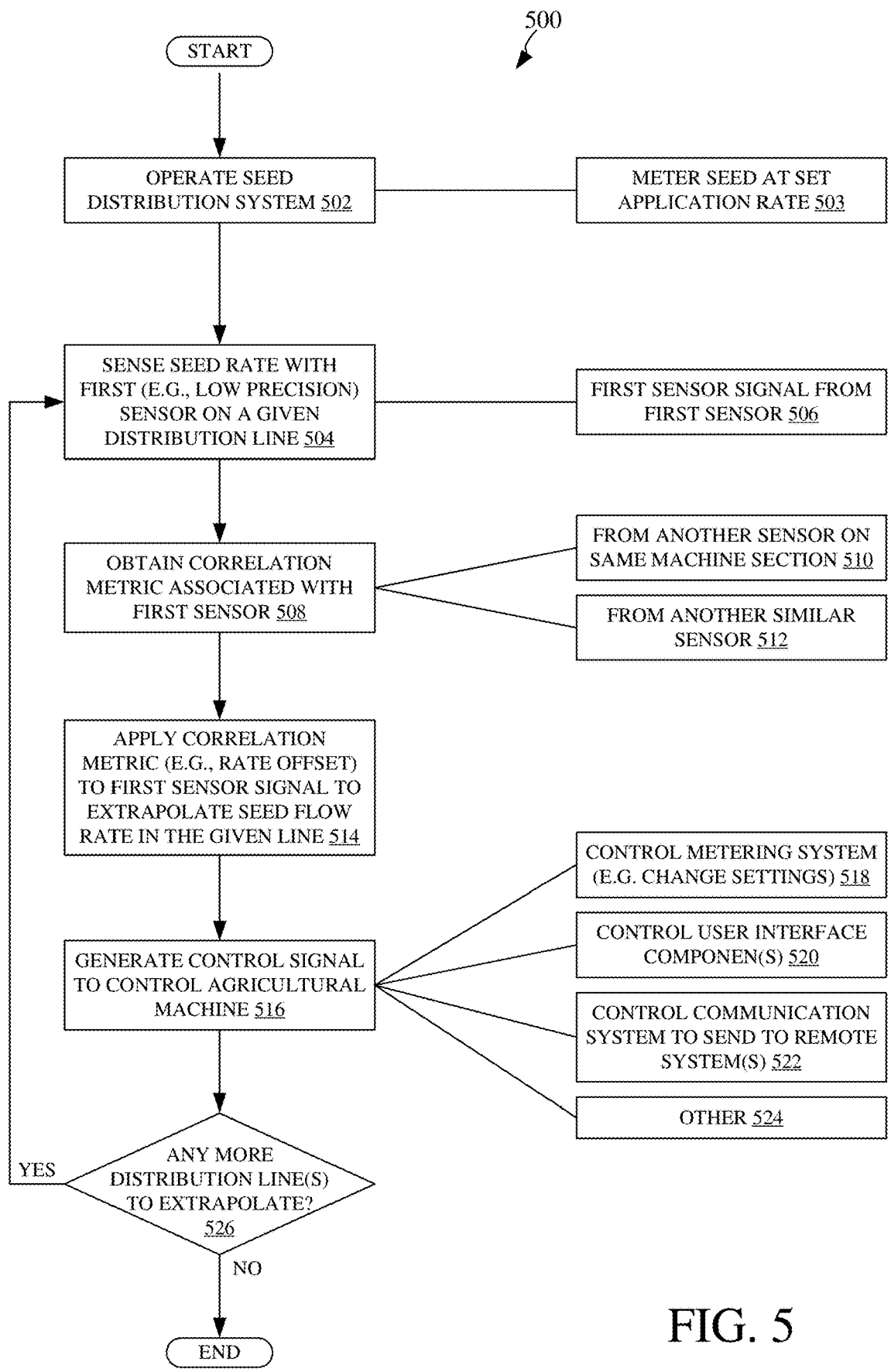
FIG. 5 is a flow diagram illustrating an example method for applying correlation metrics to a seed sensor signal to extrapolate seed flow rate.

FIG. 5 illustrates an example method 500 for applying a correlation metric to a seed sensor signal to extrapolate seed flow rate. For sake of illustration, but not by limitation, method 500 will be discussed with respect to architecture 300 shown in FIG. 3.

At block 502, seed distribution system 306 is operated to distribute seed along distribution lines to row units 308. This includes metering system 302 metering seed at a set application rate (e.g., a rate set by user 390 via user interface(s) 388). Volumetric meter 310-1 operates to meter seed into primary distribution lines 322, 324, 326, and 328. This is represented by block 503.

At block 504, a seed rate is sensed with a first seed sensor (e.g., a low precision seed sensor) on a given distribution line. For sake of the present discussion, secondary controller 370 receives a signal from the first seed sensor 408 on distribution line 342. This is represented by block 506.

At block 508, correlation application component 395 obtains a correlation metric that is associated with a sensor that is the same or similar as the sensor from which the signal is received at block 504. In this example, correlation application component 395 obtains a correlation metric (e.g., from stored correlations 398 or otherwise) that was generated using the sensor signal from sensor 404. Thus, the correlation metric was generated from another substantially similar sensor on the same machine section. This is represented by block 510. Alternatively, or in addition, the correlation metric obtained at block 508 can be obtained from a substantially similar sensor on a different section of machine 301. This is represented by block 512. The similar sensor can be a sensor having similar sensing characteristics (e.g., a similar sensing precision and/or similar maximum sensing rate), and can be of the same type and/or manufacturer/model.

At block 514, the correlation metric obtained at block 508 is applied to the first sensor signal obtained at block 504 to extrapolate the seed flow rate on the distribution line. In the present example, the seed flow rate on line 342 is extrapolated by applying the correlation metric to the sensor signal received from sensor 408.

By way of example, but not by limitation, assume the sensor signal from sensor 408 indicates a seed flow rate of ninety-two seeds/sec. By applying the correlation metric at block 514, correlation application component 395 determines that the extrapolated seed flow rate on line 342 is two hundred forty-five seeds/sec. This, of course, is by way of illustrative example only. In any case, the extrapolated seed flow rate can be utilized at block 516 to generate a control signal to control agricultural machine 301.

In one example, control signal generator 374 generates a control signal to control seed metering system 302. This includes, but is not limited to, changing settings to increase or decrease the rate at which volumetric meter 310-1 is metering seeds into distribution lines 322, 324, 326, and 328. This is represented at block 518.

At block 520, control signal generator 374 generates a control instruction that controls user interface component 378 to generate a user interface 388 that indicates the seed flow rate that is determined at block 514. For instance, the seed flow rate extrapolated for line 342 can be rendered to user 390 through display(s) 392, along with an indication that indicates a deviation from a user-defined desired flow rate. As such, the user can manually adjust the settings of seed metering system 302 based on the indication.

At block 522, control signal generator 374 can control communication component 376 to send an indication to remote system(s) 380, for example. A control signal can be generated in other ways and/or to control other components/systems as well. This is represented by block 524.

At block 526, the method determines whether there are any additional distribution lines for which to extrapolate seed flow rates. In the illustrated example, steps 504-516 are repeated for distribution lines 346, 348, 350, 352, and 354, utilizing the correlation metric that is obtained based on the sensor signals from sensors 404 and/or 406.

It can thus be seen that the present system provides a number of advantages. For example, the present system provides a seed sensing system that generates correlation metrics between seed sensors that can be applied to seed sensing signals to improve the accuracy of seed flow rate/quantity detection. Further, by obtaining the correlation metrics using higher quality seed sensors, the correlation metrics can be applied to signals from lower quality seed sensors to generate an improved, or at least more accurate, indication of the seed flow rate, without having to install additional high precision sensors on each distribution line. This reduces the complexity and cost in implementing the seed sensing system. Further, the control systems/actions generated based on the operation of the seed sensing system are also improved.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
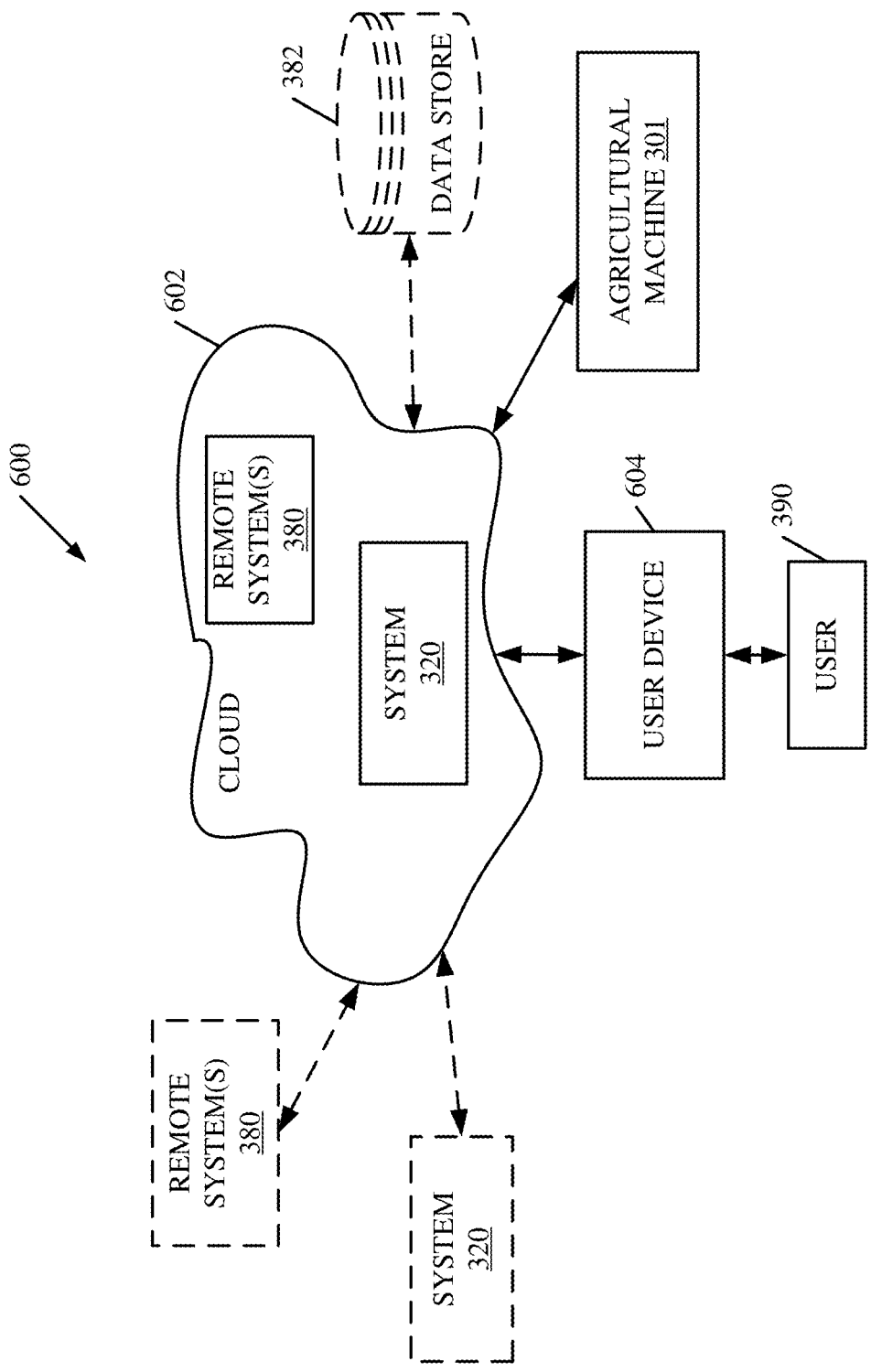
FIG. 6 is a block diagram of one example of the architecture illustrated in FIG. 3, deployed in a remote server architecture.

FIG. 6 is a block diagram illustrating architecture 300, shown in FIG. 3, except that it (or portions thereof) is deployed in a remote server architecture 600. In an example, remote server architecture 600 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 3 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 6, some items are similar to those shown in FIG. 3 and they are similarly numbered. FIG. 6 specifically shows that one or more of remote system 380 or seed metering and control system 320 can be located at a remote server location 602. The information can be provided to remote server location 602 by machine 301 (e.g., from system 320) in any of a wide variety of different ways. Therefore, user 390 and/or machine 301 can access those systems through remote server location 602. This can be done using a user device 604, for instance.

FIG. 6 also depicts another embodiment of a remote server architecture. FIG. 6 shows that it is also contemplated that some elements of FIG. 3 are disposed at remote server location 602 while others are not. By way of example, data store 382 can be disposed at a location separate from location 602, and accessed through the remote server at location 602. In another example, system 302 (or portions thereof) can be disposed at a location separate from location 602, and accessed through the remote server at location 602. In another example, system 320 can be disposed at a location separate from location 602, and accessed through the remote server at location 602. Regardless of where they are located, they can be accessed directly by user device 604, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the machine comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on machine 301 until the machine enters a covered location. The machine, itself, can then send the information to the main network.

It will also be noted that the elements of architecture 300 shown in FIG. 3, or portions thereof, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
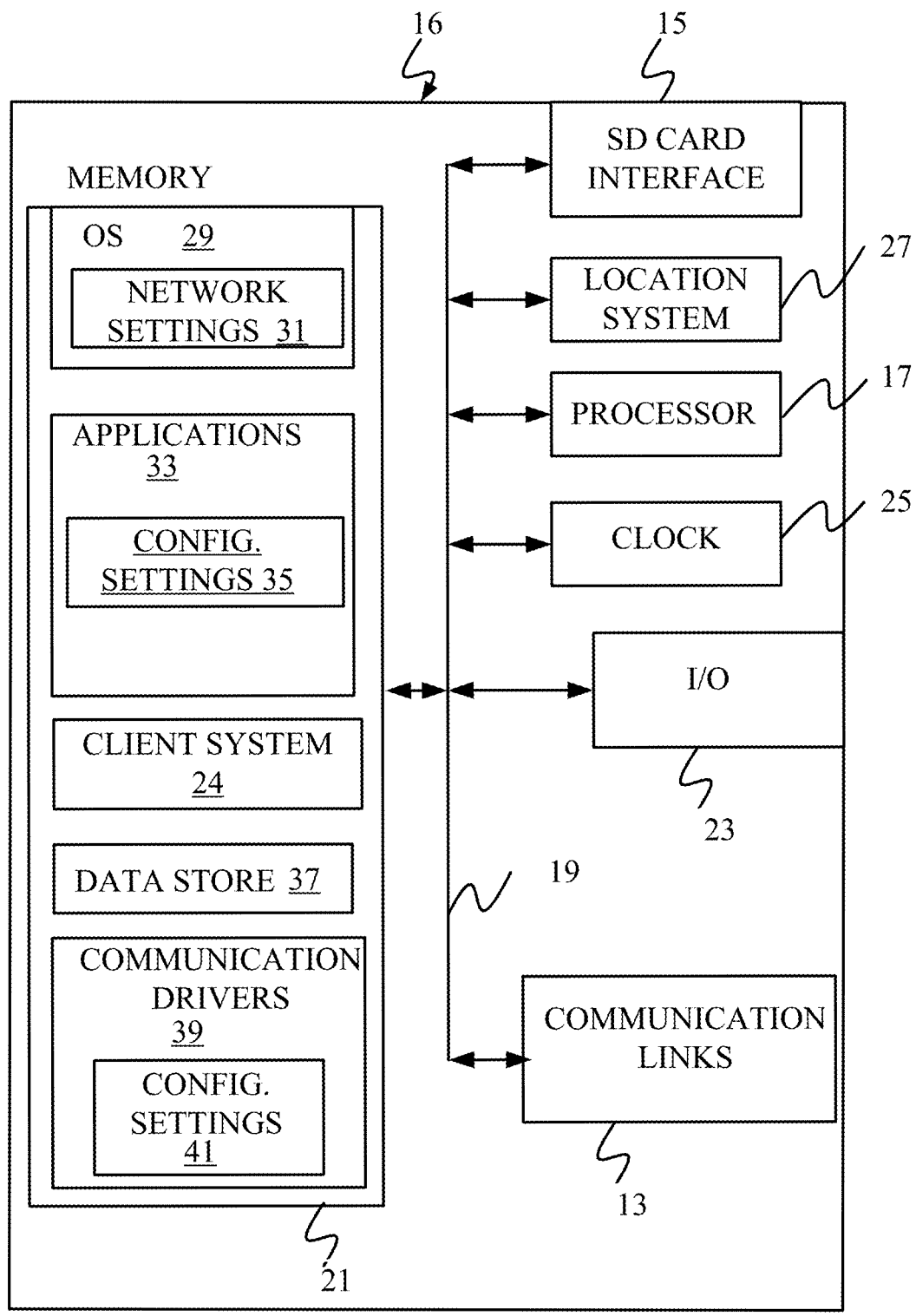
FIGS. 7-9 are examples of mobile devices that can be used in the architectures illustrated in the previous figures.
Figure 8:
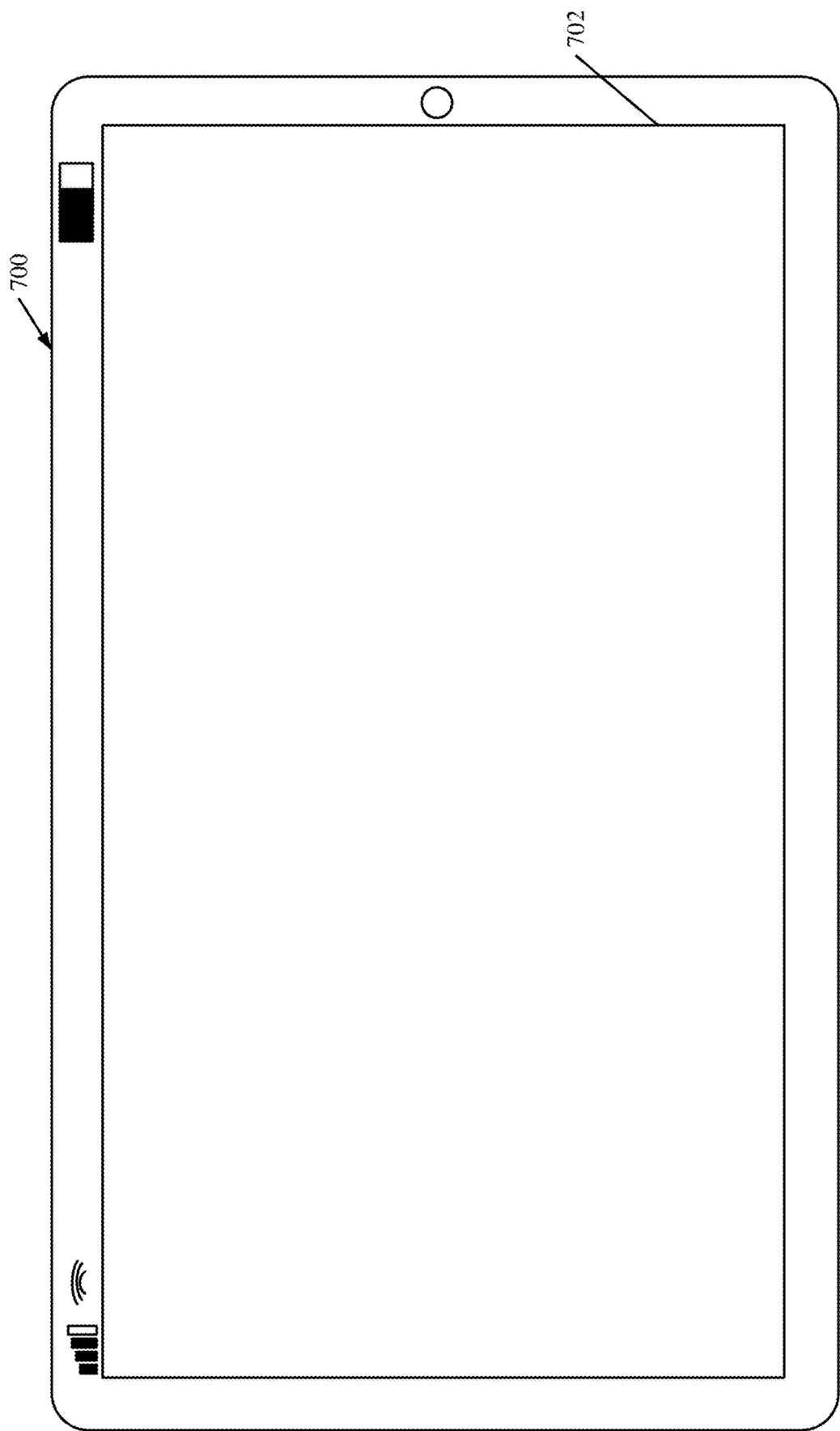
Figure 9:
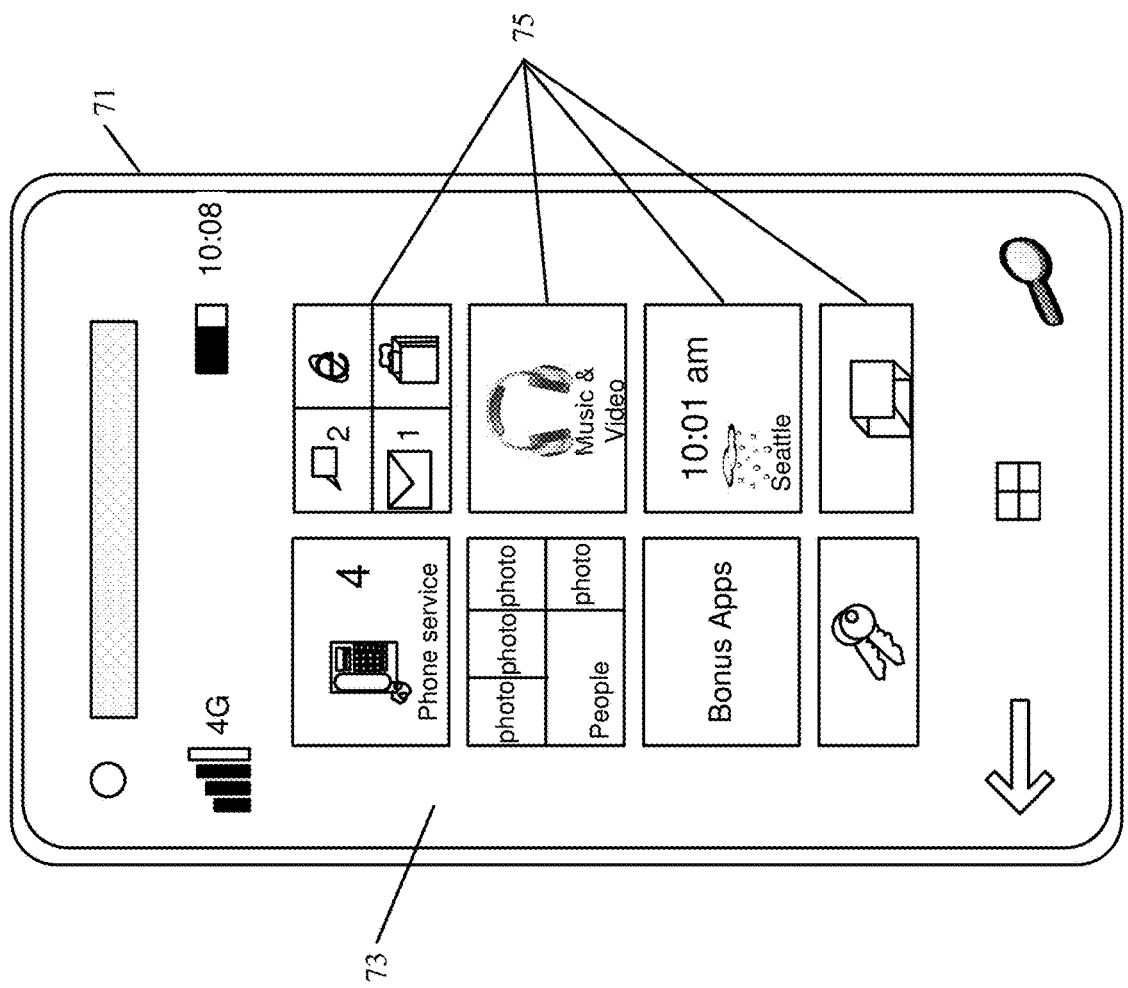

FIG. 7 is a simplified block diagram of one illustrative example of a handheld or mobile computing device that can be used as a user's or client's hand held device 16, in which the present system (or parts of it) can be deployed. For instance, a mobile device can be deployed in the operator compartment of machine 301, or as user device 604 for use in generating, processing, or displaying the plant evaluation information. FIGS. 8-9 are examples of handheld or mobile devices.

FIG. 7 provides a general block diagram of the components of a client device 16 that can run some components shown in FIG. 3, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody any processor or server from previous Figures) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 8 shows one embodiment in which device 16 is a tablet computer 700. In FIG. 8, computer 700 is shown with user interface display screen 702. Screen 702 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 700 can also illustratively receive voice inputs as well.

FIG. 9 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
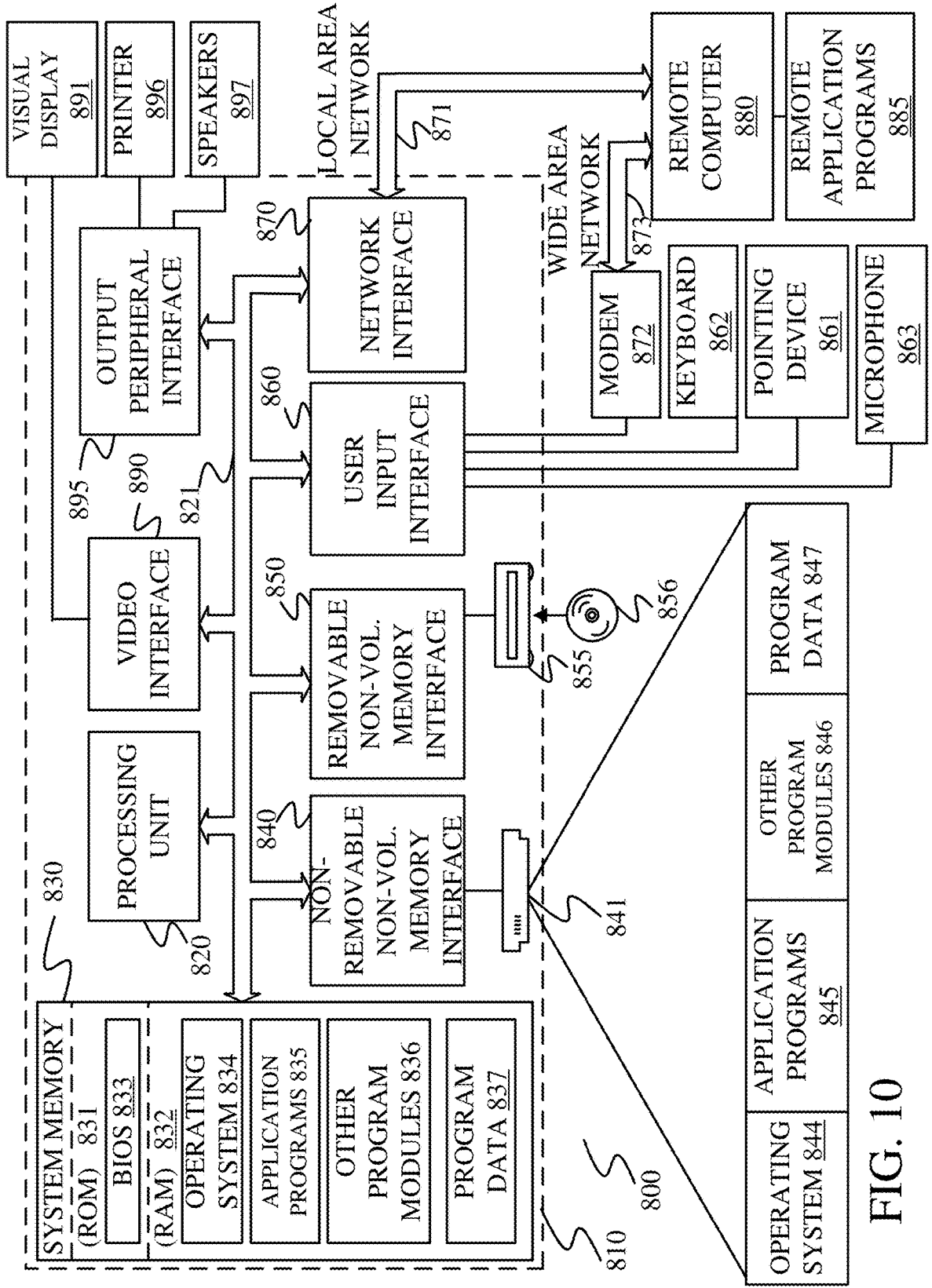
FIG. 10 is a block diagram of one example of a computing environment that can be used in the architectures shown in the previous figures.

FIG. 10 is one example of a computing environment in which elements of FIG. 3, or parts of it, (for example) can be deployed. With reference to FIG. 10, an example system for implementing some embodiments includes a general-purpose computing device in the form of a computer 810. Components of computer 810 may include, but are not limited to, a processing unit 820 (which can comprise processors or servers from any previous Figure), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 3 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, nonvolatile magnetic disk 852, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 10 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is an agricultural machine comprising:
- a material distribution system comprising a material distribution line configured to convey particulate material to a component; and
- a sensing system comprising:
  - a first sensor configured to generate a first sensor signal indicative of a measure of a flow of the particulate material in the material distribution line;
  - a second sensor configured to generate a second sensor signal indicative of a measure of the flow of the particulate material in the material distribution line; and
  - a correlation generation component configured to receive indications of the first and second sensor signals and to generate a correlation metric that represents a correlation between the first and second sensor signals.

Example 2 is the agricultural machine of any or all previous examples, wherein the material distribution line comprises a first material distribution line configured to convey a first flow of particulate material to a first component;
the material distribution system comprises a second material distribution line configured to convey a second flow of particulate material to a second component; and
the sensing system comprises:
a third sensor configured to generate a third sensor signal indicative of a measure of the second flow of the particulate material in the second material distribution line; and
a correlation application component configured to determine a rate of the second flow based on applying the correlation metric to the third sensor signal.

Example 3 is the agricultural machine of any or all previous examples, wherein the first sensor and the third sensor have substantially similar sensing precision.

Example 4 is the agricultural machine of any or all previous examples, wherein the second sensor has a higher sensing precision compared to the third sensor.

Example 5 is the agricultural machine of any or all previous examples, wherein the second sensor comprises a high precision sensor and the third sensor comprises a low precision sensor.

Example 6 is the agricultural machine of any or all previous examples, wherein
the third sensor has an error rate above ten percent for material flow rates above fifty particles per second, and
the determined rate of the second flow is greater than fifty particles per second with an error rate at or less than approximately ten percent.

Example 7 is the agricultural machine of any or all previous examples, wherein the determined rate of the second flow is greater than two hundred particles per second.

Example 8 is the agricultural machine of any or all previous examples, and further comprising:
a control component configured to generate a control signal that controls the agricultural machine based on the determined rate.

Example 9 is the agricultural machine of any or all previous examples, wherein the control signal controls a metering system configured to meter the particulate material into the second material distribution line.

Example 10 is the agricultural machine of any or all previous examples, wherein
the particulate material comprises seeds,
the component comprising a row unit configured to disburse the seeds onto a terrain, and
the material distribution system comprising an air source providing an air stream to pneumatically convey the seeds along the material distribution line to the row unit.

Example 11 is the agricultural machine of any or all previous examples, wherein the second sensor has a higher sensing precision compared to the first sensor.

Example 12 is the agricultural machine of any or all previous examples, wherein the second sensor has a maximum sensing rate that is at least four times greater than a maximum sensing rate of the first sensor.

Example 13 is the agricultural machine of any or all previous examples, wherein the first sensor comprises a low precision sensor and the second sensor comprises a high precision sensor.

Example 14 is the agricultural machine of any or all previous examples, wherein
the correlation metric comprises a first correlation metric;
the material distribution line comprises a first material distribution line configured to convey a first flow of particulate material to a first component;
the material distribution system comprises:
a second material distribution line configured to convey a second flow of particulate material to a second component; and
the sensing system comprises:
a third sensor configured to generate a third sensor signal indicative of a measure of the second flow; and
a fourth sensor configured to generate a fourth sensor signal indicative of a measure of the second flow; and
the correlation generation component is configured to:
generate a second correlation metric that represents a correlation between the third sensor signal and the fourth sensor signal; and
generate a rate offset metric based on the first and second correlation metrics.

Example 15 is the agricultural machine of any or all previous examples, wherein
the material distribution system comprises:
a primary distribution line that receives particulate material from a metering system; and
a splitter component configured to split the particulate material from the primary distribution line into the first material distribution line and the second material distribution line;
a third material distribution line configured to convey a third flow of particulate material to a third distribution end point component;
the sensing system comprises:
a fifth sensor configured to generate a fifth sensor signal indicative of a measure of the third flow; and
a correlation application component configured to determine a rate of the third flow by applying the rate offset metric to the fifth sensor signal.

Example 16 is a method performed by an agricultural machine, the method comprising:
receiving a first sensor signal from a first sensor that senses a first flow of particulate material along a first material distribution line;
receiving a second sensor signal from a second sensor that senses the first flow of particulate material along the first material distribution line;
generating a correlation metric that represents a correlation between the first sensor signal and the second sensor signal;
receiving a third sensor signal from a third sensor that senses a second flow of particulate material along a second material distribution line;
determining a rate of the second flow by applying the correlation metric to the third sensor signal; and
generating a control signal that controls the agricultural machine based on the determined rate.

Example 17 is the method of any or all previous examples, wherein
the particulate material comprises seeds;
the first material distribution line conveys the first flow of seeds to a first row unit;
the second material distribution line conveys the second flow of seeds to a second row unit;
the first and third seed sensors comprise low precision sensors; and
the second seed sensor comprises a high precision sensor.

Example 18 is an agricultural machine comprising:

a distribution system comprising:
  a first distribution line configured to convey a first seed flow to a first component; and
  a second distribution line configured to convey a second seed flow to a second component;
a metering system configured to meter seeds into the first and second distribution lines;
a seed sensing system comprising:
  a first seed sensor configured to generate a first sensor signal indicative of the first seed flow;
  a second seed sensor configured to generate a second sensor signal indicative of the first seed flow;
  a correlation generation component configured to receive indications of the first and second sensor signals and generate a correlation metric that represents a correlation between the first sensor signal and the second sensor signal;
  a third seed sensor configured to generate a third sensor signal indicative of the second seed flow; and
  a correlation application component configured to determine a rate of the second seed flow based on applying the correlation metric to the third sensor signal; and
a control system configured to generate a control signal that controls the agricultural machine based on the determined rate.

Example 19 is the agricultural machine of any or all previous examples, wherein the first and third seed sensors comprise low precision sensors, and the second seed sensor comprises a high precision sensor.

Example 20 is the agricultural machine of any or all previous examples, wherein
  each of the first and second components comprise a row unit configured to disburse the seed onto a terrain, and
  the material distribution system comprises an air source providing air streams to pneumatically convey seeds along the first and second distribution lines to the row units.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural machine comprising:
a material distribution system comprising a material distribution line configured to convey particulate material to a component; and
a sensing system comprising:
  a first sensor configured to generate a first sensor signal indicative of a measure of a flow of the particulate material in the material distribution line;
  a second sensor configured to generate a second sensor signal indicative of a measure of the flow of the particulate material in the material distribution line; and
  a correlation generation component configured to receive indications of the first and second sensor signals and to generate a correlation metric that represents a correlation between the first and second sensor signals.

2. The agricultural machine of claim 1, wherein
the material distribution line comprises a first material distribution line configured to convey a first flow of particulate material to a first component;
the material distribution system comprises a second material distribution line configured to convey a second flow of particulate material to a second component; and
the sensing system comprises:
  a third sensor configured to generate a third sensor signal indicative of a measure of the second flow of the particulate material in the second material distribution line; and
  a correlation application component configured to determine a rate of the second flow based on applying the correlation metric to the third sensor signal.

3. The agricultural machine of claim 2, wherein the first sensor and the third sensor have substantially similar sensing precision.

4. The agricultural machine of claim 3, wherein the second sensor has a higher sensing precision compared to the third sensor.

5. The agricultural machine of claim 4, wherein
the third sensor has a maximum seed sensing rate less than approximately one hundred seeds per second, and
the second sensor has a maximum seed sensing rate that is at least four times higher than the maximum seed sensing rate of the third sensor.

6. The agricultural machine of claim 4, wherein
the third sensor has an error rate above ten percent for material flow rates above fifty particles per second, and
the determined rate of the second flow is greater than fifty particles per second with an error rate at or less than approximately ten percent.

7. The agricultural machine of claim 6, wherein the determined rate of the second flow is greater than two hundred particles per second.

8. The agricultural machine of claim 2, further comprising:
a control component configured to generate a control signal that controls the agricultural machine based on the determined rate.

9. The agricultural machine of claim 8, wherein the control signal controls a metering system configured to meter the particulate material into the second material distribution line.

10. The agricultural machine of claim 1, wherein
the particulate material comprises seeds,
the component comprising a row unit configured to disburse the seeds onto a terrain, and
the material distribution system comprising an air source providing an air stream to pneumatically convey the seeds along the material distribution line to the row unit.

11. The agricultural machine of claim 1, wherein the second sensor has a higher sensing precision compared to the first sensor.

12. The agricultural machine of claim 11, wherein the second sensor has a maximum sensing rate that is at least four times greater than a maximum sensing rate of the first sensor.

13. The agricultural machine of claim 1, wherein
the correlation metric comprises a first correlation metric;
the material distribution line comprises a first material distribution line configured to convey a first flow of particulate material to a first component;
the material distribution system comprises:
  a second material distribution line configured to convey a second flow of particulate material to a second component; and
the sensing system comprises:

a third sensor configured to generate a third sensor signal indicative of a measure of the second flow; and a fourth sensor configured to generate a fourth sensor signal indicative of a measure of the second flow; and the correlation generation component is configured to:

generate a second correlation metric that represents a correlation between the third sensor signal and the fourth sensor signal; and generate a rate offset metric based on the first and second correlation metrics.

14. The agricultural machine of claim 13, wherein the material distribution system comprises:

a primary distribution line that receives particulate material from a metering system; and a splitter component configured to split the particulate material from the primary distribution line into the first material distribution line and the second material distribution line;

a third material distribution line configured to convey a third flow of particulate material to a third distribution end point component;

the sensing system comprises:

a fifth sensor configured to generate a fifth sensor signal indicative of a measure of the third flow; and a correlation application component configured to determine a rate of the third flow by applying the rate offset metric to the fifth sensor signal.

15. A method performed by an agricultural machine, the method comprising:

receiving a first sensor signal from a first sensor that senses a first flow of particulate material along a first material distribution line;

receiving a second sensor signal from a second sensor that senses the first flow of particulate material along the first material distribution line;

generating a correlation metric that represents a correlation between the first sensor signal and the second sensor signal;

receiving a third sensor signal from a third sensor that senses a second flow of particulate material along a second material distribution line;

determining a rate of the second flow by applying the correlation metric to the third sensor signal; and generating a control signal that controls the agricultural machine based on the determined rate.

16. The method of claim 15, wherein
the particulate material comprises seeds;
the first material distribution line conveys the first flow of seeds to a first row unit;
the second material distribution line conveys the second flow of seeds to a second row unit;
the first and third seed sensors comprise low precision sensors; and
the second seed sensor comprises a high precision sensor.

17. An agricultural machine comprising:
a distribution system comprising:
a first distribution line configured to convey a first seed flow to a first component; and
a second distribution line configured to convey a second seed flow to a second component;
a metering system configured to meter seeds into the first and second distribution lines;
a seed sensing system comprising:
a first seed sensor configured to generate a first sensor signal indicative of the first seed flow;
a second seed sensor configured to generate a second sensor signal indicative of the first seed flow;
a correlation generation component configured to receive indications of the first and second sensor signals and generate a correlation metric that represents a correlation between the first sensor signal and the second sensor signal;
a third seed sensor configured to generate a third sensor signal indicative of the second seed flow; and
a correlation application component configured to determine a rate of the second seed flow based on applying the correlation metric to the third sensor signal; and
a control system configured to generate a control signal that controls the agricultural machine based on the determined rate.

18. The agricultural machine of claim 17, wherein
the first and third seed sensors have maximum seed sensing rates less than approximately one hundred seeds per second, and
the second seed sensor has a maximum seed sensing rate that is at least four times higher than the maximum seed sensing rate of the first seed sensor.

19. The agricultural machine of claim 18, wherein
each of the first and second components comprise a row unit configured to disburse the seed onto a terrain, and
the material distribution system comprises an air source providing air streams to pneumatically convey seeds along the first and second distribution lines to the row units.

* * * * *